United States Patent
Son

(10) Patent No.: US 9,527,359 B2
(45) Date of Patent: Dec. 27, 2016

(54) PUSHER AXLE SUSPENSION SYSTEM HAVING SINGLE AIR SPRING

(71) Applicant: HYUNDAI MOTOR COMPANY, Seoul (KR)

(72) Inventor: Tae Young Son, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/731,354

(22) Filed: Jun. 4, 2015

(65) Prior Publication Data
US 2016/0129745 A1 May 12, 2016

(30) Foreign Application Priority Data

Nov. 10, 2014 (KR) .................. 10-2014-0155663

(51) Int. Cl.
| | |
|---|---|
| *B60G 11/28* | (2006.01) |
| *B60G 11/27* | (2006.01) |
| *B62D 61/12* | (2006.01) |
| *B60G 17/016* | (2006.01) |

(52) U.S. Cl.
CPC .............. *B60G 11/28* (2013.01); *B60G 11/27* (2013.01); *B60G 17/016* (2013.01); *B62D 61/12* (2013.01); *B60G 2202/152* (2013.01); *B60G 2300/026* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,985,445 A | * | 5/1961 | Bowser | B60G 17/0485 267/64.21 |
| 3,033,558 A | * | 5/1962 | Slemmons | B60G 11/28 267/64.24 |
| 4,325,541 A | * | 4/1982 | Korosladanyi | B60G 11/27 267/220 |
| 5,129,634 A | * | 7/1992 | Harris | B60G 15/14 267/64.21 |
| 6,089,552 A | * | 7/2000 | Pahl | B60G 11/28 267/64.21 |
| 6,286,820 B1 | * | 9/2001 | Raulf | B60G 15/14 267/64.21 |

(Continued)

FOREIGN PATENT DOCUMENTS

| | | |
|---|---|---|
| JP | 2013-119366 A | 6/2013 |
| KR | 10-2008-0092835 A | 10/2008 |

*Primary Examiner* — Nicole Verley
(74) *Attorney, Agent, or Firm* — McDermott Will & Emery LLP

(57) ABSTRACT

A pusher axle suspension system having a single air spring includes a pair of frames having mounting brackets integrally formed at lower front portions of the pair of frames, respectively. A link arm includes a front end connected to each mounting bracket of the pair of frames by a mounting bush. Axle sheets are disposed at lower portions of the pair of frames, respectively, to support a pusher axle. The axle sheets are connected to a rear end of the link arm by a hinge. A composite air spring is provided between a rear end of the axle sheet and a bottom surface of the pair of frames. The composite air spring moves the axle sheet upward or downward to adjust a height of the pusher axle and to absorb vibration due to a road surface during traveling.

8 Claims, 5 Drawing Sheets

(56) References Cited

U.S. PATENT DOCUMENTS

| | | | | |
|---|---|---|---|---|
| 6,293,570 B1 * | 9/2001 | Gottschalk | B60G 7/02 | 280/86.5 |
| 6,402,128 B1 * | 6/2002 | Trowbridge | B60G 11/28 | 267/64.11 |
| 6,685,173 B2 * | 2/2004 | Oldenettel | B60G 11/28 | 267/122 |
| 6,722,640 B2 * | 4/2004 | Memmel | B60G 9/003 | 267/64.24 |
| 6,820,884 B2 * | 11/2004 | McCann | B60G 9/003 | 280/124.116 |
| 6,880,839 B2 * | 4/2005 | Keeler | B62D 61/12 | 280/124.153 |
| 6,883,813 B2 * | 4/2005 | Gottschalk | B62D 61/125 | 180/209 |
| 7,175,165 B1 * | 2/2007 | Vande Brake | F16F 9/057 | 267/64.21 |
| 7,226,045 B2 * | 6/2007 | Brookes | B60G 13/003 | 188/321.11 |
| 7,261,303 B2 * | 8/2007 | Stefan | B60G 17/0155 | 280/124.106 |
| 8,511,652 B2 * | 8/2013 | Moulik | B60G 15/14 | 267/122 |
| 8,800,975 B2 * | 8/2014 | Moulik | B60G 15/14 | 267/64.24 |
| 8,967,639 B2 * | 3/2015 | Conaway | B60G 5/04 | 280/124.128 |
| 9,308,796 B2 * | 4/2016 | Leonard | B60G 15/12 | |
| 2008/0054537 A1 * | 3/2008 | Harrison | B60G 17/016 | 267/64.16 |
| 2015/0035211 A1 * | 2/2015 | Koeske | B60G 11/27 | 267/64.27 |
| 2015/0321530 A1 * | 11/2015 | Leonard | B60G 11/27 | 267/64.27 |
| 2015/0343872 A1 * | 12/2015 | Drapeau | B60G 7/001 | 280/124.157 |

* cited by examiner

-- Related Art --

PUSHER AXLE SUSPENSION SYSTEM HAVING SINGLE AIR SPRING

CROSS-REFERENCE TO RELATED APPLICATION

This application claims the benefit of priority to Korean Patent Application No. 10-2014-0155663 filed in the Korean Intellectual Property Office on Nov. 10, 2014, the entire content of which is incorporated herein by reference.

TECHNICAL FIELD

The present disclosure relates to a pusher axle suspension system. More particularly, the present disclosure relates to a pusher axle suspension system having a single air spring capable of implementing a function of a lift air spring and a ride air spring.

BACKGROUND

In a pusher axle suspension system of a vehicle, a rear wheel shaft of a large vehicle e.g., a vehicle having five shafts, moves up when the vehicle is unloaded and moves down when the vehicle is loaded. That is, when the vehicle is empty, travel resistance decreases by moving up a pusher axle when pusher axle tends to move down. When the vehicle is loaded, an accumulated load is supported by moving the pusher axle downwards.

The pusher axle suspension system includes a lift air spring to move the pusher axle up/down according to an electric signal of an up/down switch, and a ride air spring to absorb vibration from a road surface when the pusher axle moves down by the lift air spring.

FIG. 1 is a perspective view illustrating a pusher axle suspension system applied to an existing pusher axle vehicle.

Referring to FIG. 1, a pusher axle suspension system includes a front frame 101, an axle sheet 103, a pusher axle 105, a lift arm 107, a lift air spring 109, and a ride air spring 111.

The front frame 101 is mounted on a vehicle body, a front end of the axle sheet 103 is coupled with the front frame 101 through a mounting bush, and a rear end of the axle sheet 103 is supported at the pusher axle 105 having a wheel which is axially coupled. A front end of the lift arm 107 is coupled with the front frame 101 through the mounting bush, and a rear end of the lift arm 107 is coupled to the axle sheet 103 by a hinge.

The lift air spring 109 is disposed between the axle sheet 103 and the lift arm 107 so that the axle sheet 103 and the lift arm 107 perform a three bar link operation through air pressure supply control to control up/down operations of the pusher axle 105.

In addition, the ride air spring 111 is installed between the pusher axle 105 and the vehicle body to absorb vibration from a road surface.

Here, the lift air spring 109 and the ride air spring 111 are connected to an air tank (not shown) through an air pressure supply hose (not shown), and control air pressure through a solenoid valve (not shown).

Accordingly, the lift air spring 109 controls the up/down operations of the pusher axle 105 through the air pressure supply control, and the ride air spring 111 absorbs vibration from the road surface as the pusher axle 105 moves down.

However, the existing pusher axle suspension system requires the lift air spring 109 and the ride air spring 111 so that a configuration is complicated together with an air supply system, and productivity is deteriorated.

In addition, upon the up/down operations of the axle sheet 103 by the lift air spring 109, a load is concentrated on the mounting bush to connect the axle sheet 103 and the lift arm 107 with the front frame 101 so that lifespan of the mounting bush is reduced.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide a pusher axle suspension system having a single air spring capable of simultaneously implementing a function of a lift air spring and a function of a ride air spring by applying a two stage piston structure between an axle sheet for supporting a pusher axle and a frame.

According to an exemplary embodiment of the present inventive concept, a pusher axle suspension system having a single air spring includes a pair of frames having mounting brackets integrally formed at lower front portions of the pair of frames, respectively. A link arm includes a front end connected to each mounting bracket of the pair of frames by a mounting bush. Axle sheets are disposed at lower portions of the pair of frames, respectively, to support a pusher axle. The axle sheets are connected to a rear end of the link arm by a hinge. A composite air spring is provided between a rear end of the axle sheet and a bottom surface of the pair of frames. The composite air spring moves the axle sheet upward or downward to adjust a height of the pusher axle and to absorb vibration due to a road surface during traveling. The composite air spring may include a spring tube having a top side coupled with a lower rear side of the frame by a mounting plate and having a first hollow air pressure chamber formed therein. An external piston is connected to a lower portion of the spring tube so that a bottom side of the external piston is coupled with a rear side on the axle sheet. The external piston has a second hollow air pressure chamber formed therein. An internal piston is disposed inside the second air pressure chamber of the external piston. A piston rod has a bottom end connected to a center of the internal piston and a top end thereof connected to a linear bearing, which is attached to the mounting plate, inside the spring tube via a rotation joint.

The top end of the piston rod may be connected to the linear bearing in forward and backward directions and in a rotational direction so that the piston rod absorbs position variation of the internal piston.

The linear bearing may include: a linear rail fixed to the mounting plate at a top end of the spring tube. A slider slidably moves along the linear rail, and integrally connected to the rotating joint.

The spring tube may include a first air nozzle connected to a first air supply hose at an upper side of the spring tube to supply and exhaust air to and from the spring tube. The external piston may include a second air nozzle connected to a second internal air supply hose, which is connected to a first internal air supply hose, at an upper side of the external piston inside the spring tube to supply and exhaust air to and from the external piston. When air supplied to the second air pressure chamber is exhausted after being compressed in a first air pressure chamber, the pusher axle may move upward. When the air supplied to the first air pressure chamber is exhausted after being compressed in the second air pressure chamber, the pusher axle may move downward.

DETAILED DESCRIPTION

Hereinafter, an exemplary embodiment of the present inventive concept will be described with reference to the accompanying drawings.

Accordingly, the drawings and description are to be regarded as illustrative in nature and not restrictive.

Figure 1:
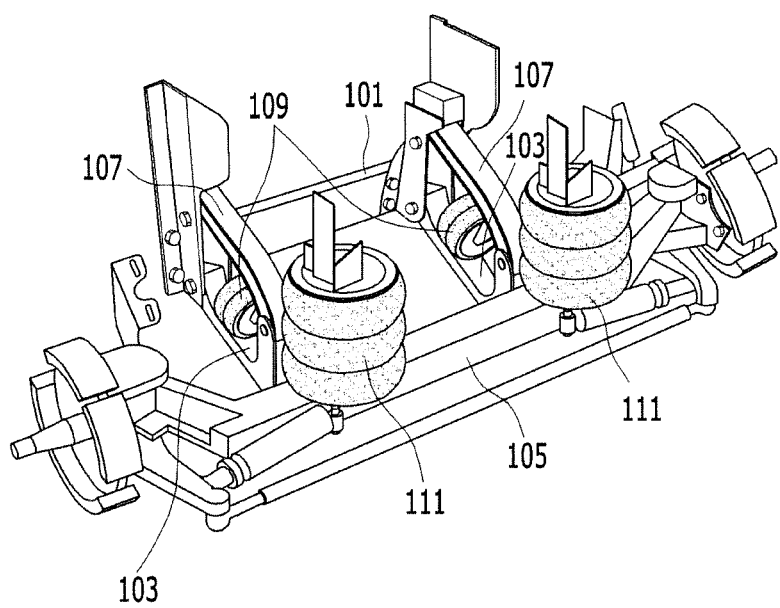
FIG. 1 is a perspective view illustrating a pusher axle suspension system applied to an existing pusher axle vehicle.
Figure 2:
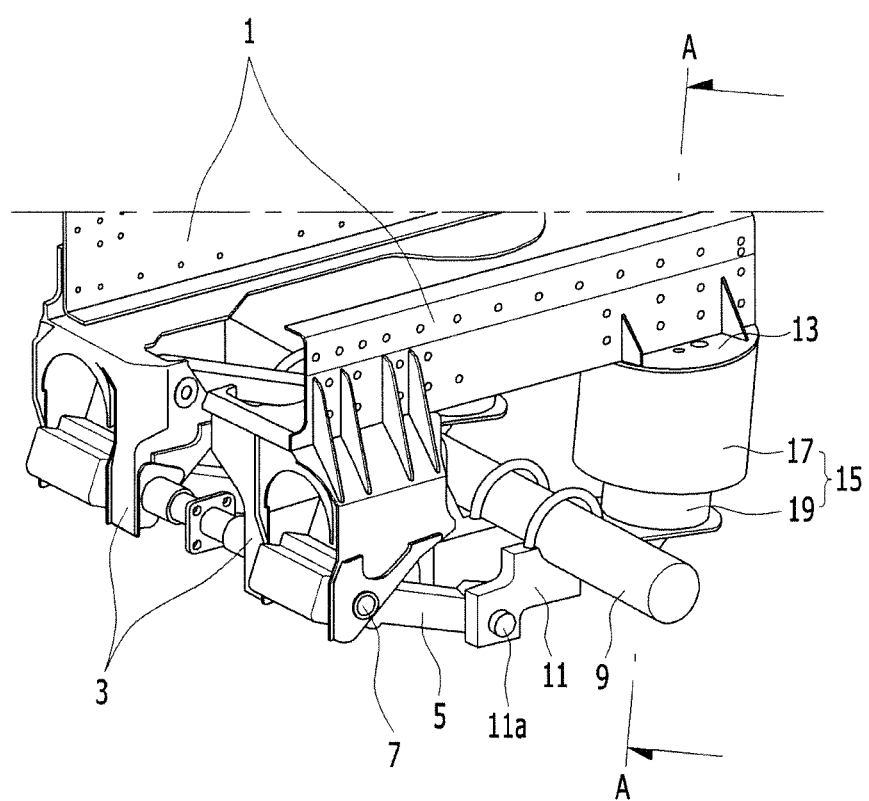
FIG. 2 is a perspective view illustrating a pusher axle suspension system having a single air spring according to an exemplary embodiment of the present inventive concept.

FIG. 2 is a perspective view illustrating a pusher axle suspension system having a single air spring according to an exemplary embodiment of the present inventive concept.

Referring to FIG. 2, a pusher axle suspension system having a single air spring according to an exemplary embodiment of the present inventive concept includes a pair of frames 1, a link arm 5, axle sheets 11, and a composite air spring 15. Mounting brackets 3 are integrally formed on lower front portions of the pair of frames 1, respectively. A front end of the link arm 5 is connected to each mounting bracket 3 through a mounting bush 7. The axle sheets 11 are disposed at lower portions of the pair of frames 1 in a length direction of a vehicle, respectively, and support a pusher axle 9 which is axially coupled to a wheel. The axle sheets 11 are connected to a rear end of the link arm 5 by a hinge 11a.

In addition, the composite air spring 15, which is disposed between a rear end of the axle sheet 11 and a bottom surface of each frame 1, controls up/down movement of the axle sheet 11 to adjust a height of the pusher axle 9 and to absorb vibration from a road surface during traveling.

Hereinafter, the above composite air spring 15 will be described in detail.

Figure 3:
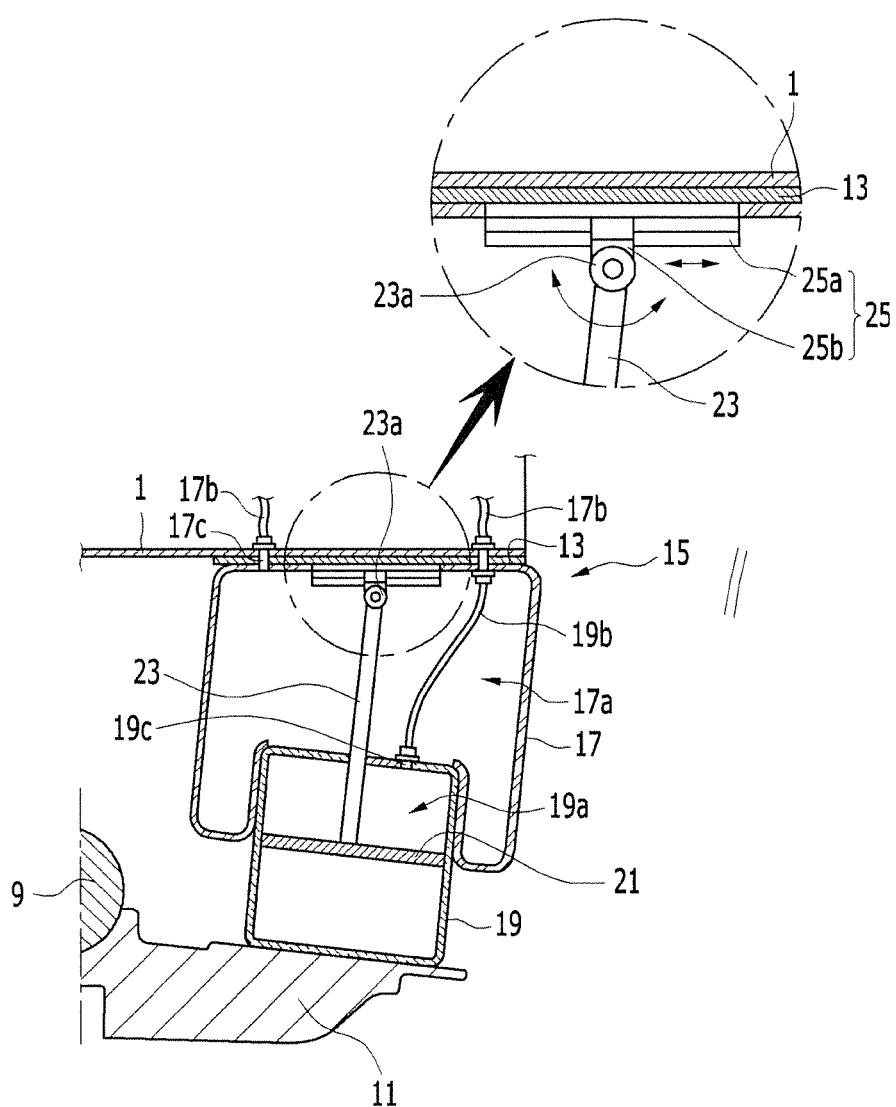
FIG. 3 is a cross-sectional view taken along line A-A of FIG. 2.

FIG. 3 is a cross-sectional view taken along line A-A of FIG. 2.

Referring to FIG. 3, the composite air spring 15 includes a spring tube 17, an external piston 19, an internal piston 21, and a piston rod 23.

A top side of the spring tube 17 is coupled with a lower rear side of the each frame 1 through a mounting plate 13. The external piston 19 forms a first air pressure chamber 17a inside the spring tube 17 while being connected to a lower portion of the spring tube 17, a bottom side of the external piston 19 is coupled with a rear side on the axle sheet 11, and the external piston 19 is formed therein with a second hollow air pressure chamber 19a.

The internal piston 21 is disposed inside the second air pressure chamber 19a of the external piston 19. In addition, a bottom end of the piston rod 23 is connected to a center of the internal piston 21 through an upper portion of the external piston 19. A top end of the piston rod 23 is connected to a linear bearing 25 configured at the mounting plate 13 inside the spring tube 17 through a rotation joint 23a.

That is, the top end of the piston rod 23 is connected to the linear bearing 25 in forward and backward directions and in a rotational direction to have the degree of freedom by the linear bearing 25 and the rotation joint 23a, so that the piston rod 23 absorbs position variation of the internal piston 21. Here, the linear bearing 25 includes a linear rail 25a and a slider 25b.

The linear rail 25a is fixed to the mounting plate 13 at a top end of the spring tube 17. The slider 25b slidably moves along the linear rail 25a, and is integrally connected to the rotation joint 23a. Further, an air nozzle 17c connected to an air supply hose 17b is provided at an upper side of the spring tube 17 so that air from an air tank (not shown) is supplied and exhausted.

The external piston 19 includes an air nozzle 19c connected to an internal air supply hose 19b through an interior of the spring tube 17 at one side thereof so that the air from the air tank (not shown) is supplied and exhausted.

An operational state of the pusher axle suspension system having a single air spring according to an exemplary embodiment of the present inventive concept will be described through the above configuration hereinafter.

Figure 4:
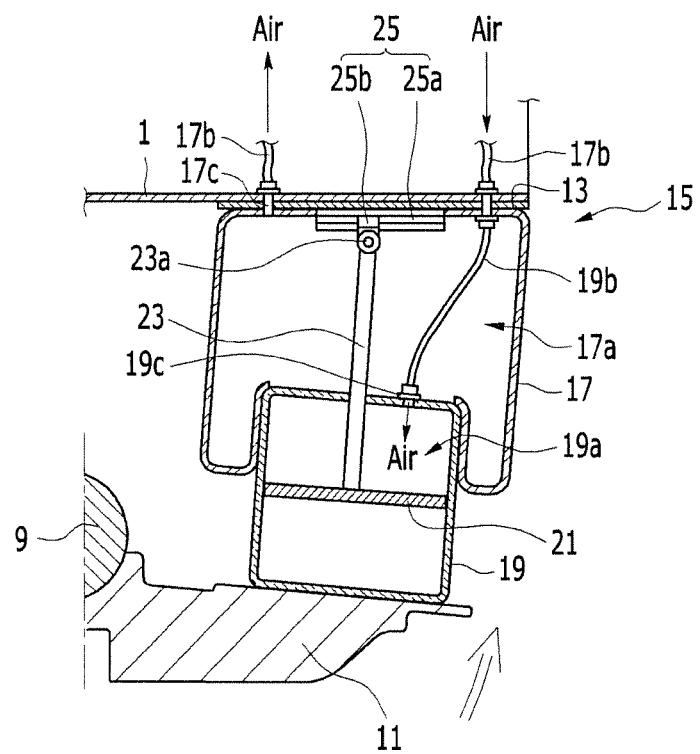
FIG. 4 and FIG. 5 are views showing up/down operational states of the air spring device for a pusher axle suspension system according to an exemplary embodiment of the present inventive concept.
Figure 5:
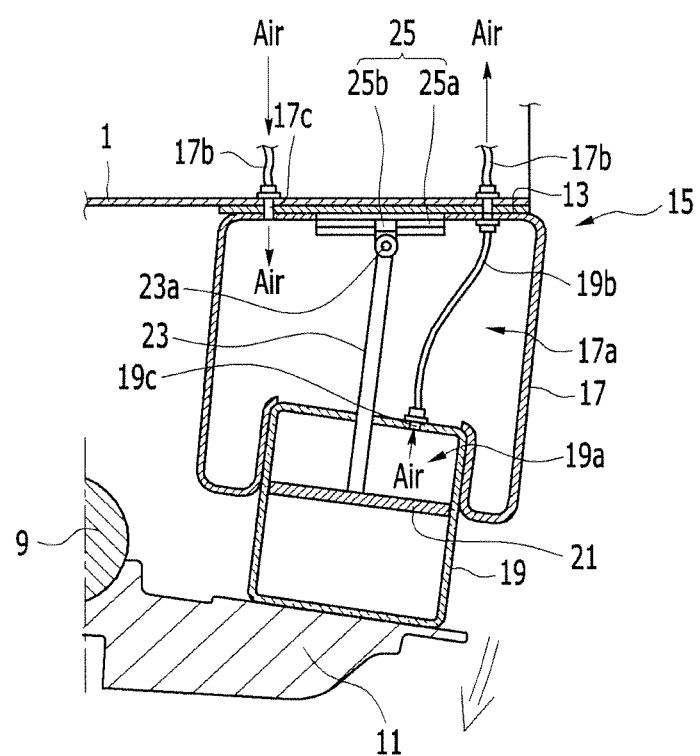

FIG. 4 is a view showing an "up" movement operational state of the pusher axle suspension system having a single air spring according to an exemplary embodiment of the present inventive concept. FIG. 5 is a view showing a "down" movement operational state of the pusher axle suspension system having a single air spring according to an exemplary embodiment of the present inventive concept.

Referring to FIG. 4, the compressed air is supply-controlled in the second air pressure chamber 19a of the external piston 19, and compressed air in the first air pressure chamber 17a of the spring tube 17 is exhaust-controlled.

In the "up" movement operational state, the external piston 19, which is connected to the linear bearing 25 by the piston rod 23, ascends inside the internal piston 21 to rotatably lift a rear end of the axle sheet 11 based on the mounting bush 7 as a center of rotation.

The external piston 19 ascends inside the spring tube 17 together with the axle sheet 11 based on the mounting bush 7 so that a front end of the piston rod 23 rotatably moves in a forward direction by the linear bearing 25 and the rotation joint 23a due to angle variation caused as the external piston 19 ascends.

Referring to FIG. 5, the compressed air is supply-controlled in the first air pressure chamber 17a of the spring tube 17, and the air compressed in the second air pressure chamber 19a of the external piston 19 is exhaust-controlled.

In the "down" movement operational state, the external piston 19 ascends based on the internal piston 21 which is connected to the linear bearing 25 by the piston rod 23 to move down a rear end of the axle sheet 11 based on the mounting bush 7 as the center of rotation.

The external piston 19 descends from the spring tube 17 together with the axle sheet 11 based on the mounting bush 7 as the center of rotation so that a front end of the piston rod 23 rotatably moves in the forward direction by the linear bearing 25 and the rotation joint 23a due to angle variation as the external piston 19 descends.

Here, a sleeve type and a bellows type formed of a rubber material which undergoes stretching deformation according to the upward and downward operations of the external piston 19 may be applicable to the spring tube 17.

When the axle sheet 11 moves down, a tire of the pusher axle 9 makes contact with a road surface, and absorbs vibration by buffer action of the spring tube 17 and the external piston 19.

As described above, the pusher axle suspension system having a single air spring according to the present disclosure may simultaneously implement a function of a lift air spring and a function of a ride air spring according to the related art by the composite air spring 15 between the axle sheet 11 and the pair of frames 1. Further, cost may be reduced and productivity may be improved by simplifying the whole structure through the composite air spring 15.

In addition, a high load applied to the mounting bush 7 between the each frame 1 and the link arm 5 may be eliminated by omitting an existing lift air spring. Accordingly, the degree of freedom in a design of the mounting bush 7 may be increased and lifespan may be increased.

The pusher axle suspension system having a single air spring according to the present disclosure may reduce the cost and improve the productivity by simplifying the whole structure by simultaneously implementing a function of a lift air spring and a function of a ride air spring by applying a two stage piston structure between an axle sheet for supporting a pusher axle and a frame.

Further, according to the present disclosure, a high load applied to the mounting bush between the frame and the link arm may be excluded by removing an existing lift air spring so that the degree of freedom in a design of the mounting bush may be increased and the durable life may be increased.

Although an exemplary embodiment of the present inventive concept has been described until now, the present disclosure is not limited to the embodiment, and includes all modifications within an equivalent range which may be easily changed by those skilled in the art to which the present invention pertains.

While this disclosure has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A pusher axle suspension system having a single air spring comprising:
    a pair of frames having mounting brackets integrally formed at lower front portions of the pair of frames, respectively;
    a link arm, a front end of which is connected to each mounting bracket of the pair of frames by a mounting bush;
    axle sheets disposed at lower portions of the pair of frames, respectively, to support a pusher axle, the axle sheets connected to a rear end of the link arm by a hinge; and
    a composite air spring provided between a rear end of the axle sheets and a bottom surface of the pair of frames, the composite air spring configured to move the axle sheets upward or downward to adjust a height of the pusher axle and to absorb vibration due to a road surface during traveling,
    wherein the composite air spring comprises:
    a spring tube, a top side of which is coupled with a lower rear side of each frame by a mounting plate and having a first hollow air pressure chamber formed therein;
    an external piston connected to a lower portion of the spring tube so that a bottom side of the external piston is coupled with a rear side on the axle sheet, the external piston having a second hollow air pressure chamber formed therein in which the first and second hollow air pressure chambers are separated from air communication therebetween;
    an internal piston disposed inside the second air pressure chamber of the external piston; and
    a piston rod, a bottom end of which is connected to a center of the internal piston and a top end of which is connected to a linear bearing, which is attached to the mounting plate, inside the spring tube via a rotation joint.

2. The pusher axle suspension system of claim 1, wherein the top end of the piston rod is movably connected to the linear bearing in forward and backward directions and in a rotational direction so that the piston rod absorbs position variation of the internal piston.

3. The pusher axle suspension system of claim 1, wherein the linear bearing comprises:
    a linear rail fixed to the mounting plate at a top end of the spring tube; and
    a slider slidably moving along the linear rail and integrally connected to the rotating joint.

4. The pusher axle suspension system of claim 1, wherein the spring tube comprises a first air nozzle connected to a first air supply hose at an upper side of the spring tube to supply and exhaust air to and from the spring tube.

5. The pusher axle suspension system of claim 1, wherein the external piston comprises a second air nozzle connected to a second internal air supply hose, which is connected to a first internal air supply hose, at an upper side of the external piston inside the spring tube to supply and exhaust air to and from the external piston.

6. The pusher axle suspension system of claim 1,
    wherein when air supplied to the second air pressure chamber is exhausted after being compressed in the first air pressure chamber, the pusher axle moves upward, and
    wherein when the air supplied to the first air pressure chamber is exhausted after being compressed in the second air pressure chamber, the pusher axle moves downward.

7. The pusher axle suspension system of claim 2, wherein the linear bearing comprises:
    a linear rail fixed to the mounting plate at a top end of the spring tube; and
    a slider slidably moving along the linear rail and integrally connected to the rotating joint.

8. A pusher axle suspension system having a single air spring comprising:
    a pair of frames having mounting brackets integrally formed at lower front portions of the pair of frames, respectively;
    a link arm, a front end of which is connected to each mounting bracket of the pair of frames by a mounting bush;
    axle sheets disposed at lower portions of the pair of frames, respectively, to support a pusher axle, the axle sheets connected to a rear end of the link arm by a hinge; and
    a composite air spring provided between a rear end of the axle sheets and a bottom surface of the pair of frames, the composite air spring configured to move the axle sheets upward or downward to adjust a height of the pusher axle and to absorb vibration due to a road surface during traveling, wherein the composite air spring comprises:

a spring tube, a top side of which is coupled with a lower rear side of the each frame by a mounting plate and having a first hollow air pressure chamber formed therein;

an external piston connected to a lower portion of the spring tube so that a bottom side of the external piston is coupled with a rear side on the axle sheet, the external piston having a second hollow air pressure chamber formed therein;

an internal piston disposed inside the second air pressure chamber of the external piston; and a piston rod, a bottom end of which is connected to a center of the internal piston and a top end of which is connected to a linear bearing, which is attached to the mounting plate, inside the spring tube via a rotation joint, and wherein the top end of the piston rod is movably connected to the linear bearing in forward and backward directions and in a rotational direction so that the piston rod absorbs position variation of the internal piston.

* * * * *